United States Patent
Kim et al.

(10) Patent No.: US 10,223,763 B2
(45) Date of Patent: Mar. 5, 2019

(54) APPARATUS AND METHOD FOR PERFORMING FOURIER TRANSFORM

(71) Applicants: SAMSUNG ELECTRONICS CO., LTD., Suwon-si (KR); University of Seoul Industry Cooperation Foundation, Seoul (KR)

(72) Inventors: Hojung Kim, Suwon-si (KR); Kichul Kim, Seoul (KR); Hongseok Lee, Seongnam-si (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 57 days.

(21) Appl. No.: 15/377,336

(22) Filed: Dec. 13, 2016

(65) Prior Publication Data
US 2017/0178281 A1    Jun. 22, 2017

(30) Foreign Application Priority Data
Dec. 17, 2015   (KR) .......................... 10-2015-0181077

(51) Int. Cl.
  *G06T 1/60*   (2006.01)
  *G06T 9/00*   (2006.01)
  *G06F 17/14*  (2006.01)

(52) U.S. Cl.
  CPC .............. *G06T 1/60* (2013.01); *G06F 17/142* (2013.01); *G06T 9/00* (2013.01); *G06T 2207/20056* (2013.01)

(58) Field of Classification Search
  CPC ......... G06F 17/142; G06T 2207/20056; G06T 1/60

USPC ........................................................ 382/280
  See application file for complete search history.

(56) References Cited

U.S. PATENT DOCUMENTS

| | | | |
|---|---|---|---|
| 2003/0195938 A1* | 10/2003 | Howard .................... | G06F 8/45 709/208 |
| 2004/0078405 A1* | 4/2004 | Bhanot ...................... | G06F 9/52 708/404 |
| 2008/0028013 A1 | 1/2008 | Kamegawa et al. | |

(Continued)

FOREIGN PATENT DOCUMENTS

| | | |
|---|---|---|
| JP | 11-339005 A | 12/1999 |
| JP | 2005-174142 A | 6/2005 |

(Continued)

OTHER PUBLICATIONS

Rodriguez-Ramos, et al. (2D-FFT implementation on FPGA for wavefront phase recovery from the CAFADIS camera), SPIE, pp. 1-11, 2008.*

(Continued)

*Primary Examiner* — Daniel G Mariam
(74) *Attorney, Agent, or Firm* — Sughrue Mion, PLLC

(57) ABSTRACT

A method for performing a Fourier transform includes generating intermediate data by performing a 1D FFT on input image data on a row-by-row basis, designating different banks of a memory as respective start positions, dividing and storing the intermediate data at the start positions, reading out the intermediate data at the start positions, and generating final data by performing a 1D FFT on the intermediate data on a column-by-column basis.

18 Claims, 10 Drawing Sheets

(56) References Cited

U.S. PATENT DOCUMENTS

2009/0219380 A1* 9/2009 Cable ............... G03H 1/0808
                                              348/40
2010/0017450 A1 1/2010 Sun et al.

FOREIGN PATENT DOCUMENTS

JP    2009-239684 A    10/2009
JP    2014-174268 A     9/2014

OTHER PUBLICATIONS

Communication dated Mar. 2, 2017 issued by European Patent Office in counterpart European Application No. 16203882.2.
Jie Zhou et al., "Window Memory Accesses Method in Alternate Row/Column Matrix Access Systems", 2010 2nd International Conference on Computer Engineering and Technology, vol. 3, 2010 IEEE, pp. V3-201-V3-205.

* cited by examiner

| | | | |
|---|---|---|---|
| 0,992 ......... 0,1023<br>u0v31<br>31,992    31,1023 | 32,1023 ......... 63,1023<br>u1v31<br>32,992    63,992 | ... | 480,1023 ......... 511,1023<br>u15v31<br>480,992    511,992 |
| ⋮ | ⋮ | | ⋮ |
| 0,32 ......... 0,63<br>u0v1<br>31,32    31,63 | 32,63 ......... 63,63<br>u1v1<br>32,32    63,32 | ... | 480,63 ......... 511,63<br>u15v1<br>480,32    511,32 |
| 0,0  0,1 ......... 0,31<br>1,0  1,1         1,31<br>u0v0<br>31,0    31,31 | 32,31 ......... 63,31<br>u1v0<br>32,0    63,0 | ... | 480,31 ......... 511,31<br>u15v0<br>480,0    511,0 |

APPARATUS AND METHOD FOR PERFORMING FOURIER TRANSFORM

CROSS-REFERENCE TO RELATED APPLICATION

This application claims priority from Korean Patent Application No. 10-2015-0181077, filed on Dec. 17, 2015 in the Korean Intellectual Property Office, the disclosure of which is incorporated herein by reference in its entirety.

BACKGROUND

1. Field

Apparatuses and methods consistent with exemplary embodiments relate to an apparatus and method for performing a Fourier transform.

2. Description of the Related Art

Technologies related to three-dimensional (3D) images have been widely developed. Research on an apparatus for embodying a high image quality hologram in real time by using a complex spatial light modulator (SLM) capable of simultaneously controlling the amplitude and phase of light has been actively conducted.

To reproduce a hologram moving picture, a computer generated hologram (CGH) may be used. An image processing apparatus calculates a hologram value at each position on a hologram plane, and thus, a computational amount is quite huge. In other words, to represent one point in space, the image processing apparatus performs a single Fourier transform. Accordingly, in order to represent an image in space, the Fourier transform should be performed as many times as the number of pixels.

An image processing apparatus such as a television (TV), a mobile device, etc. may process image data to reproduce a hologram image. In this case, the image processing apparatus may perform a Fourier transform on the image data and reproduce an image using transformed data.

When the image processing apparatus performs the Fourier transform, a computational amount is relatively large and much time is needed. In particular, portable devices, such as mobile devices, are limited in their size and usable power. Accordingly, there is a demand for a method of reducing a computational amount and time for performing a Fourier transform.

SUMMARY

Exemplary embodiments provide an apparatus and method for performing a Fourier transform.

According to an aspect of an exemplary embodiment, a method for performing a Fourier transform includes performing a first one-dimensional (1D) fast Fourier transform (FFT) on image data on a row-by-row basis in order to generate intermediate data, designating at least two different banks of a memory as respective start positions, and dividing and storing the intermediate data at the start positions, reading out the intermediate data at the start positions, and generating final data by performing a second 1D FFT on the intermediate data on a column-by-column basis.

In the designating the at least two different banks of the memory as the start positions, sequentially shifted banks may be designated as the start positions.

In the designating the at least two different banks of the memory as the start positions, a second bank that is different from a first bank of a previous start position may be designated as a start position.

In the performing the first 1D FFT, for each respective row of the image data, a corresponding one from among a plurality of first processors may perform a respective 1D FFT, and in the designating the at least two different banks of the memory as the start positions and the dividing and storing the intermediate data at the start positions, the intermediate data output from the plurality of first processors may be sequentially stored, such that when a respective 1D FFT for a corresponding row has been performed, another bank is designated as a start position.

The intermediate data may be divided into a plurality of windows, each window having a size that corresponds to a number of first processors and a number of second processors, and in the designating the at least two different banks of the memory as the start positions and the dividing and storing the intermediate data at the start positions, the intermediate data included in the plurality of windows in the same row may be sequentially stored from same start positions.

In the designating the at least two different banks of the memory as the start positions and the dividing and storing the intermediate data at the start positions, when a row is changed, the subsequently generated intermediate data may be stored at a changed start position.

The start position may indicate an address of the memory at which intermediate data transformed in parallel by a plurality of first processors is stored.

In the reading out the intermediate data, a pixel value that corresponds to a number of a plurality of first processors that generate the intermediate data in parallel may be read out at a first start position.

According to an aspect of another exemplary embodiment, a method for performing a Fourier transform includes performing a 1D FFT on image data on a column-by-column basis, designating at least two different banks of a memory as respective start positions, and dividing and storing the intermediate data at the start positions, reading out the intermediate data at the start positions, and generating final data by performing a 1D FFT on the intermediate data on a row-by-row basis.

According to an aspect of another exemplary embodiment, a Fourier transform apparatus includes a first core configured to perform a 1D FFT on image data on a row-by-row basis in order to generate intermediate data, a memory comprising a plurality of banks, the memory being configured to designate at least two different banks from among the plurality of banks as respective start positions, and to divide and store the intermediate data at the start positions, and a second core configured to read out the intermediate data at the start positions, and to generate final data by performing a 1D FFT on the intermediate data on a column-by-column basis.

The memory may be further configured to designate sequentially shifted banks as start positions.

The memory may be further configured to designate a second bank which is different from a first bank that corresponds to a previous start position as a start position.

The first core may include a plurality of first processors, and each respective one from among the plurality of first processors may be configured to perform a respective 1D FFT with respect to a corresponding row of the image data, and the memory may be further configured to sequentially store the intermediate data output from the plurality of first processors in respective banks of the memory, such that when a row of the image data on which the plurality of first processors perform a 1D FFT is changed, the memory may be further configured to designate another bank as a start position.

The first core may include a plurality of first processors, the second core may include a plurality of second processors, the intermediate data may be divided into a plurality of windows, each window having a respective size that corresponds to a number of the plurality of first processors and a number of the plurality of second processors, and the memory may be further configured to store each of the plurality of windows in the same row of the intermediate data at same start positions.

When a row of the window is changed, the memory may be further configured to store the subsequently generated intermediate data at a changed start position.

The start position may indicate an address of the memory at which intermediate data transformed in parallel by a plurality of first processors is stored.

The second core may be further configured to read out a pixel value that corresponds to a number of first processors that generate the intermediate data in parallel, from a first start position.

BRIEF DESCRIPTION OF THE DRAWINGS

The above and/or other aspects will become apparent and more readily appreciated from the following description of exemplary embodiments, taken in conjunction with the accompanying drawings in which:

FIG. 7 illustrates dividing data, according to an exemplary embodiment;

DETAILED DESCRIPTION

Figure 1:
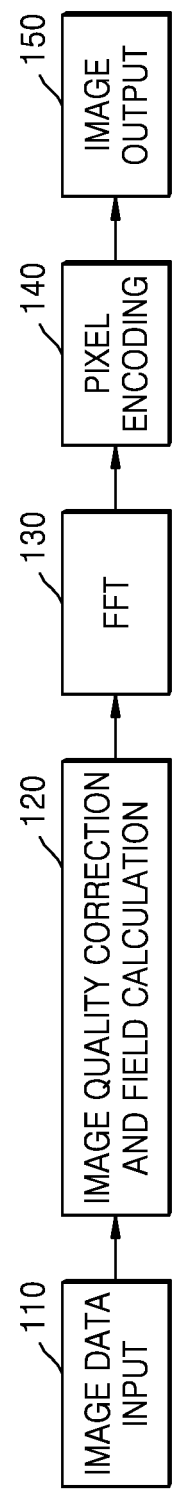
FIG. 1 is a flowchart for describing a process of processing image data.

Reference will now be made in detail to exemplary embodiments, examples of which are illustrated in the accompanying drawings, wherein like reference numerals refer to like elements throughout. Also, the size of each layer illustrated in the drawings may be exaggerated for convenience of explanation and clarity. In this regard, the present exemplary embodiments may have different forms and should not be construed as being limited to the descriptions set forth herein. Accordingly, the exemplary embodiments are merely described below, by referring to the figures, to explain aspects of the present description. In a layer structure, when a constituent element is disposed "above" or "on" to another constituent element, the constituent element may be only directly on the other constituent element or above the other constituent elements in a non-contact manner.

FIG. 1 is a flowchart of a process of processing image data. Referring to FIG. 1, an image processing apparatus may receive image data and output an image.

In operation 110, the image processing apparatus receives image data. For example, in a computer-generated holography (CGH) operation, when a layer-based algorithm is applied to image data, the image data may include color data and/or depth data. The color data may be data indicating a plurality of colors for each plane. The layer-based algorithm is a method of dividing a reproduction area of a hologram based on a depth and processing data of each divided plane. The image processing apparatus may generate a hologram image by performing a Fourier transform or an inverse Fourier transform on data of each divided plane.

In operation 120, the image processing apparatus performs image quality correction and field calculation. The image processing apparatus may correct image data in order to improve image quality of the image data.

In operation 130, the image processing apparatus performs the Fourier transform or a fast Fourier transform (FFT). For example, the image processing apparatus may perform the Fourier transform on image data in a two-dimensional (2D) matrix form. The image processing apparatus may perform a one-dimensional (1D) Fourier transform twice, thereby effectively performing a 2D Fourier transform. The image processing apparatus may perform the 1D Fourier transform on image data in a row direction (i.e., on a row-by-row basis) and the 1D Fourier transform on the transformed image data in a column direction (i.e., on a column-by-column basis). The image processing apparatus generates a holographic image as a result of the execution of the Fourier transform.

In operation 140, the image processing apparatus performs pixel encoding. The image processing apparatus generates data to be input to a screen via pixel encoding.

In operation 150, the image processing apparatus outputs an image to an image display apparatus.

The image processing apparatus may include a plurality of cores that are capable of performing the Fourier transform in parallel on image data. For example, the image processing apparatus may assign image data of each plane to the cores, and the image data assigned to the cores are Fourier transformed.

Figure 2:
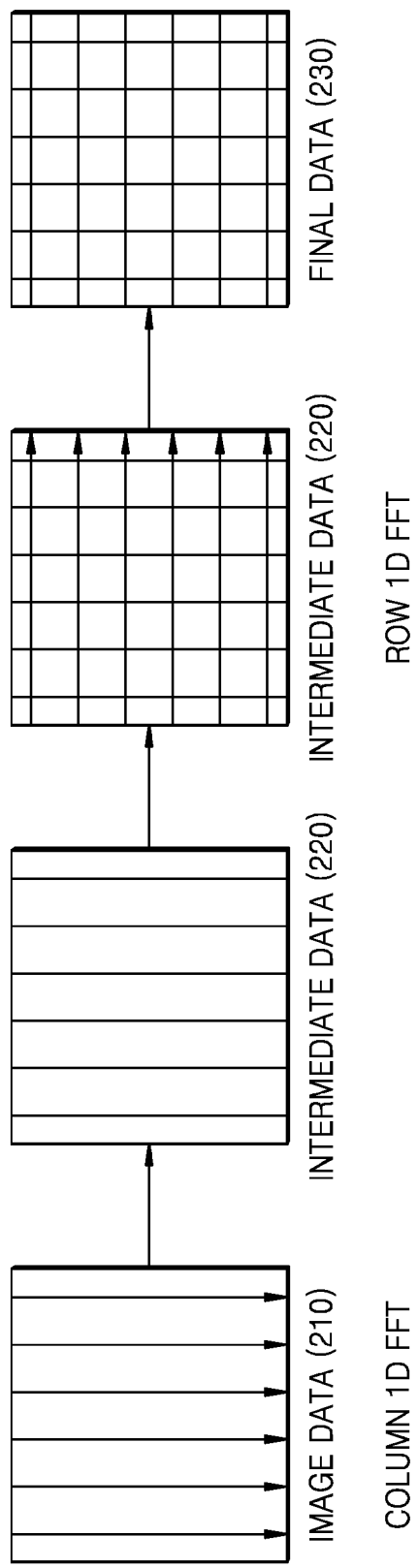
FIG. 2 illustrates a process of transforming data, according to an exemplary embodiment.

FIG. 2 illustrates a process of transforming data. Referring to FIG. 2, the image processing apparatus or a Fourier transform apparatus generates final data 230 by performing a 1D FFT twice on image data 210. For example, the image processing apparatus performs a first 1D FFT on the image data 210 in the column direction (i.e., on a column-by-column basis) in order to generate intermediate data 220, and then performs a second 1D FFT on the intermediate data 220 in the row direction (i.e., on a row-by-row basis) in order to generate the final data 230.

Figure 3:
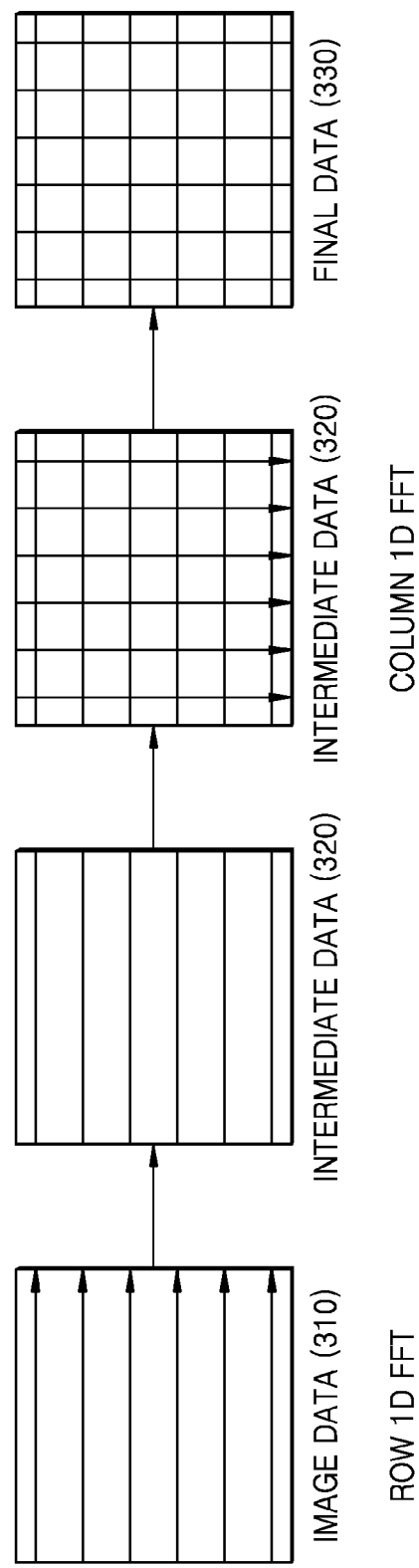
FIG. 3 illustrates a process of transforming data, according to another exemplary embodiment.

In FIG. 2, for example, a case in which the image processing apparatus performs the first 1D FFT in the column direction is described. In FIG. 3, for example, a case in which the image processing apparatus performs the first 1D FFT in the row direction is described.

Referring to FIG. 2, the image processing apparatus performs a 1D FFT on the image data 210 in the column direction, i.e., column by column. The intermediate data 220 is obtained as a result of performing a 1D FFT on the image data 210 in the column direction. Arrows marked on the image data 210 indicate directions in which the image processing apparatus performs a 1D FFT. Straight lines marked on the intermediate data 220 indicate directions in which the image data 210 is transformed.

The image processing apparatus stores the intermediate data 220 in a memory (not shown). The image processing apparatus may store the intermediate data 220 in a plurality of banks of the memory by dividing the intermediate data 220. For example, the image processing apparatus may divide the intermediate data 220 into rectangular or square windows, and then store the intermediate data 220 included in the windows from a start position by designating different banks as respective start positions. When storing the intermediate data 220, the image processing apparatus may store the intermediate data 220 included in the window in the row direction. A method of storing the intermediate data 200 in the row direction is described in detail with reference to FIGS. 7, 8, and 9.

When the image processing apparatus stores the intermediate data 220 in different banks, in the reading out of data, the intermediate data 220 is read out from the different banks so that a delay which might otherwise be caused by a time required for activating the banks may be prevented.

The image processing apparatus may perform a 1D FFT in the row direction, i.e., row by row, by reading out the intermediate data 220 that is stored. When reading out the intermediate data 220, the image processing apparatus may read out the intermediate data 220 in the row direction and output the intermediate data 220 that is read to each 1D FFT processor. Since the intermediate data 220 located in the same row is stored at the same point or pixel with respect to the start position of the respective designated banks, the image processing apparatus may read out the intermediate data 220 in the row direction as the intermediate data 220 is read out from the position where the intermediate data 220 located in the same row is stored. In particular, the image processing apparatus reads out the pixel value from the same position of the respective designated banks.

The image processing apparatus performs a 1D FFT on the intermediate data 220 in the row direction, i.e., row by row, thereby generating the final data 230. The final data 230 is data obtained as the image data 210 is 1D FFT-transformed sequentially, first in the column direction and second in the row direction.

FIG. 3 illustrates a process of transforming data, according to another exemplary embodiment. Referring to FIG. 3, the image processing apparatus or the Fourier transform apparatus generate final data 330 by performing a 1D FFT twice on image data 310. For example, the image processing apparatus generates intermediate data 320 by performing a first 1D FFT on image data 310 in the row direction, i.e., on a row-by-row basis, and generates the final data 330 by performing a second 1D FFT on the intermediate data 320 in the column direction, i.e., on a column-by-column basis. In FIGS. 2 and 3, the order of a column and a row is switched and the description presented in FIG. 2 may be identically applied to the description of FIG. 3.

Figure 4:
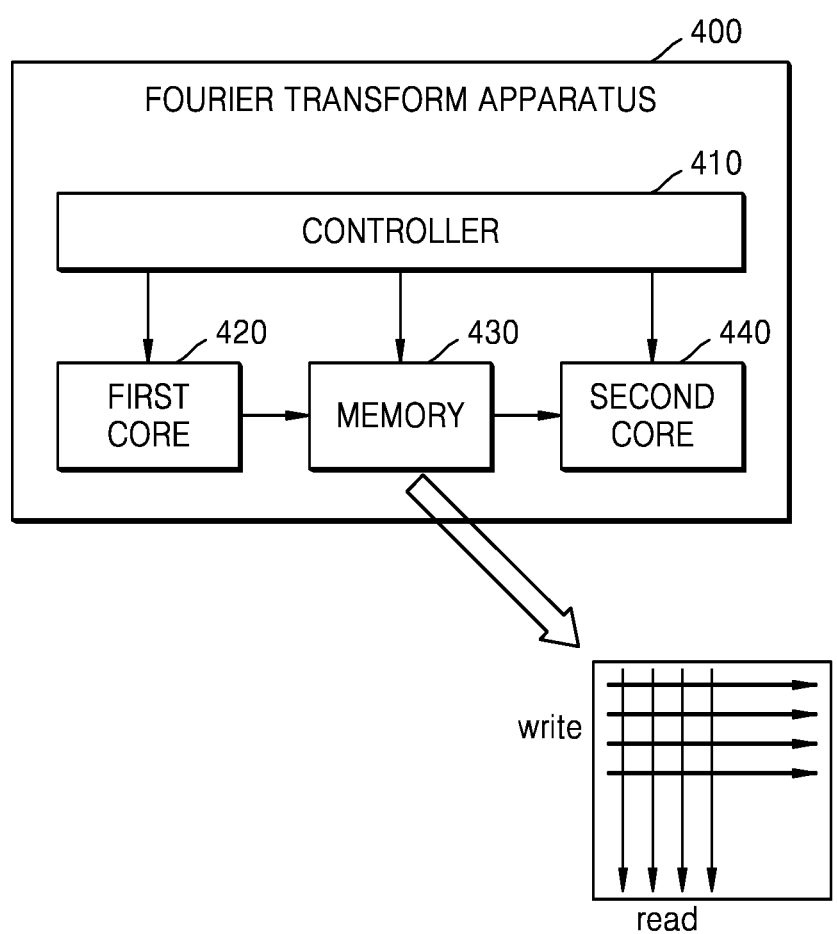
FIG. 4 is a block diagram of a structure of a transform apparatus.

FIG. 4 is a block diagram of a structure of a transform apparatus. Referring to FIG. 4, a Fourier transform apparatus 400 may be an example of the image processing apparatus. The Fourier transform apparatus 400 may be a graphic processing apparatus or a data processing apparatus, or a part of the graphic processing apparatus or data processing apparatus.

The Fourier transform apparatus 400 may include a controller 410, a first core 420, a memory 430, and a second core 440. Although FIG. 4 illustrates that the Fourier transform apparatus 400 includes two cores, that is, the first and second cores 420 and 440, the Fourier transform apparatus 400 may include three or more cores.

The controller 410 controls the first core 420, the memory 430, and the second core 440. The controller 410 may designate operations to be performed by the first and second cores 420 and 440. For example, the controller 410 may control the first core 420 to perform a 1D FFT on the image data 310 in the row direction and the second core 440 to perform a 1D FFT on the intermediate data 320 in the column direction. The controller 410 may designate a position in the memory 430 at which the intermediate data 320 is stored.

The first core 420 may perform the Fourier transform on data. For example, the first core 420 may generate the intermediate data 320 by performing a 1D FFT on the image data 310 in the row direction. The performance of a 1D FFT on the image data 310 in the row direction by the first core 420 indicates performing a 1D FFT on pixel values included in respective columns of the image data 310.

The first core 420 may output the intermediate data 320 to the memory 430. Whenever a result value of performing a 1D FFT, that is, the intermediate data, is generated, the first core 420 may output the result value to the memory 430.

The first core 420 may include a plurality of 1D FFT processors. Each respective 1D FFT processor may perform a respective 1D FFT on a corresponding column of the image data 310. For example, the number of 1D FFT processors including the first core 420 may be a divisor of the number of the columns of the image data 310. For example, when the number of the columns of the image data 310 is 512, the first core 420 may include eight (8), sixteen (16), thirty-two (32), or sixty-four (64) 1D FFT processors.

The memory 430 may store and output the intermediate data 320. Since the first core 420 and the second core 440 perform a 1D FFT in different directions, e.g., in the column direction and in the row direction, when the intermediate data 320 is stored in the memory 430, the intermediate data 320 may be stored in a direction in which the second core 440 performs a 1D FFT.

For example, as illustrated in FIG. 2, when the first core 420 performs a 1D FFT on the image data 210 in the column direction and the second core 440 performs a 1D FFT on the intermediate data 220 in the row direction, the memory 430 may store the intermediate data 220 in the row direction and output the stored intermediate data 220 to the second core 440 in the row direction.

The storing of the intermediate data 220 in the row direction signifies that the pixel values of the intermediate data 220 are sequentially stored in a storage space of the memory 430 and the sequentially stored pixel values are located in the same column of the intermediate data 220.

In contrast, as illustrated in FIG. 3, when the first core 420 performs a 1D FFT on the image data 310 in the row direction and the second core 440 performs a 1D FFT on the intermediate data 320 in the column direction, the memory 430 may store the intermediate data 320 in the column direction and output the stored intermediate data 320 to the second core 440 in the column direction.

The storing the intermediate data 320 in the column direction signifies that the pixel values of the intermediate data 320 are sequentially stored in a storage space of the memory 430 and the sequentially stored pixel values are located in the same column of the intermediate data 320. The memory 430 may divide the intermediate data 320 in the same column to be stored in different banks.

The memory 430 may be dynamic random access memory (DRAM) or synchronous DRAM (SDRAM). The memory 430 may include a plurality of banks. In particular, the storage space of the memory 430 is sectioned into a plurality of banks. For example, the memory 430 may include eight (8) banks, and the memory 430 may divide the intermediate data 320 and store divided intermediated data in the respective banks. A structure of the banks is described in detail with reference to FIGS. 8 and 9.

The second core 440 may perform the Fourier transform on the intermediate data 320. For example, the second core 440 may perform a 1D FFT on the intermediate data 320 in the column direction. If the first core 420 performs a 1D FFT on the image data 310 in the row direction, the second core 440 performs a 1D FFT on the intermediate data 320 in the column direction.

The second core 440 may include a plurality of 1D FFT processors. Each respective 1D FFT processor may perform a respective 1D FFT on a corresponding column of the intermediate data 320. For example, the number of the 1D FFT processors included in the second core 440 may be a divisor of the number of the columns of the image data 310. For example, when the number of the columns of the image data 310 is 1024, the second core 440 may include eight (8), sixteen (16), thirty-two (32), or sixty-four (64) 1D FFT processors.

The second core 440 may read out the intermediate data 320 stored in the memory 430. The second core 440 may obtain the intermediate data 320 in the column direction by reading out the pixel values of the same column stored in the respective banks of the memory 430.

Figure 5:
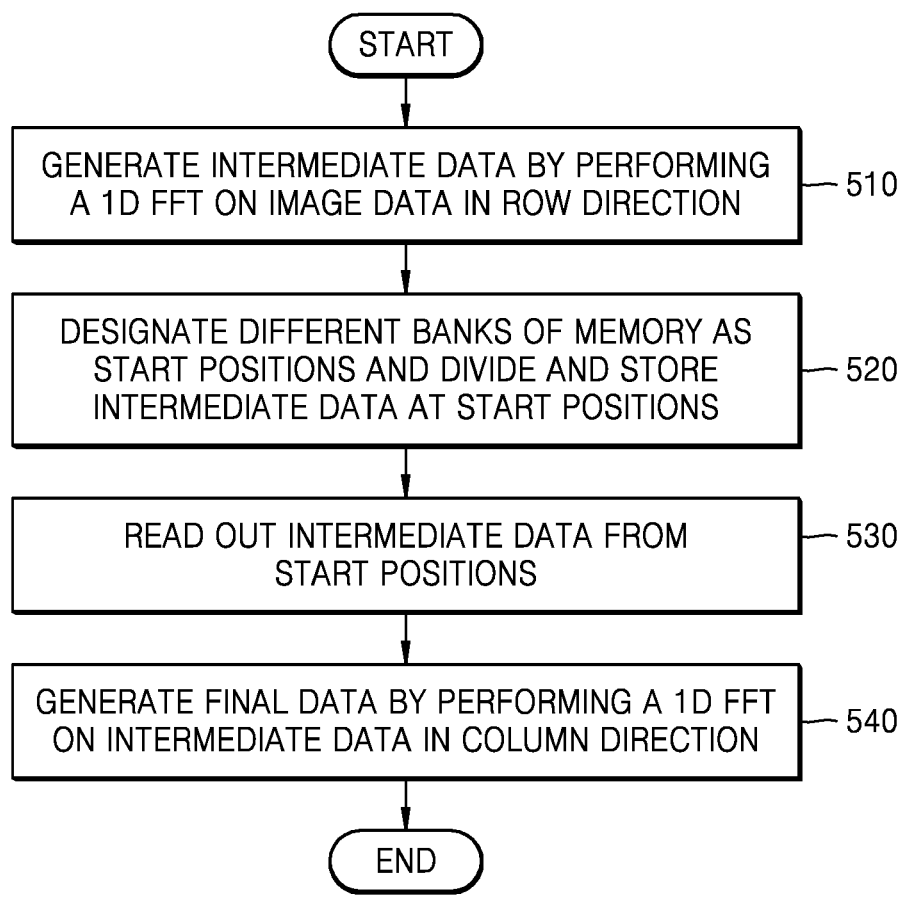
FIG. 5 is a flowchart of a Fourier transform method, according to an exemplary embodiment.

FIG. 5 is a flowchart for explaining a Fourier transform method, according to an exemplary embodiment.

In operation 510, the Fourier transform apparatus 400 performs a 1D FFT on the image data 310 in the row direction in order to generate the intermediate data 320. The image data 310 and the intermediate data 320 may be arranged in the form of a 2D matrix. For example, the image data 310 and the intermediate data 320 may be data having a size of 1024×512.

The first core 420 performs a 1D FFT with respect to each row of the image data 310. The 1D FFT processors included in the first core 420 perform respective 1D FFTs with respect to the corresponding rows of the image data 310. In this state, one 1D FFT processor may perform a 1D FFT with respect to a plurality of rows. For example, when there are thirty-two (32) 1D FFT processors, a first 1D FFT processor may perform a 1D FFT with respect to the $0^{th}$ row, the $32^{nd}$ row, the $64^{th}$ row, etc. of the image data 310.

In operation 520, the Fourier transform apparatus 400 designates different banks of the memory 430 as respective start positions, and divides and stores the intermediate data 320 at the respective start positions. For example, the Fourier transform apparatus 400 may designate sequentially shifted banks as start positions. If the Fourier transform apparatus 400 designates the $0^{th}$ bank as a start position, the $1^{st}$ bank may be designated as a next start position, and the $2^{nd}$ bank may be designated as a further next start position. If the intermediate data 320 is divided into three parts, the Fourier transform apparatus 400 may store a first part from the $0^{th}$ bank, a second part from the $1^{st}$ bank, and a third part from the $2^{nd}$ bank.

In another example, the Fourier transform apparatus 400 may designate a bank that is different from bank that corresponds to a previous start position as a start position. The Fourier transform apparatus 400 may designate a particular bank that is different from the bank of a previous start position as a next start position, like designation of the $1^{st}$ bank as the first start position, the $4^{th}$ bank as the second start position, and the $7^{th}$ bank as the third start position.

The intermediate data 320 may be divided based on a row in which the data is located. For example, if the intermediate data 320 includes sixty-four (64) rows, the $0^{th}$ to $31^{st}$ rows form a first part and the $32^{nd}$ to $63^{rd}$ rows form a second part. The Fourier transform apparatus 400 may store the intermediate data 320 in the column direction. For example, the first column of the first part, the first column of the second part, and the first column of the third part of the intermediate data 320 may be sequentially stored in the $0^{th}$ bank.

In operation 530, the Fourier transform apparatus 400 reads out the intermediate data 320 from the respective start positions of the memory 430. The Fourier transform apparatus 400 may read out the intermediate data 320 in the column direction by repeating the process of reading out the intermediate data 320 from each start position to a particular position. For example, the Fourier transform apparatus 400 may read out the $1^{st}$ to $32^{nd}$ pixel values from the $0^{th}$ bank, the $1^{st}$ to $32^{nd}$ pixel values from the $1^{st}$ bank, and the $1^{st}$ to $32^{nd}$ pixel values from the $2^{nd}$ bank, thereby reading out the first column of the intermediate data 320. Furthermore, the Fourier transform apparatus 400 reads out the $33^{rd}$ to $64^{th}$ pixel values from the $0^{th}$ bank, the $33^{rd}$ to $64^{th}$ pixel values from the $1^{st}$ bank, and the $33^{rd}$ to $64^{th}$ pixel values from the $2^{nd}$ bank, thereby reading out the second column of the intermediate data 320. As described above, the Fourier transform apparatus 400 may read out the intermediate data 320 in the column direction by reading out the pixel values at the same relative position from the respective start positions.

In operation 540, the Fourier transform apparatus 400 generates the final data 330 by performing a 1D FFT on the intermediate data 320 in the column direction. Since in the operation 530 the Fourier transform apparatus 400 reads out the intermediate data 320 from the memory 430 in the column direction, the Fourier transform apparatus 400 may perform a 1D FFT on the intermediate data 320 in the column direction by performing a 1D FFT on the read-out data. The respective columns may be transformed by sequentially being input into the 1D FFT processor.

Figure 6:
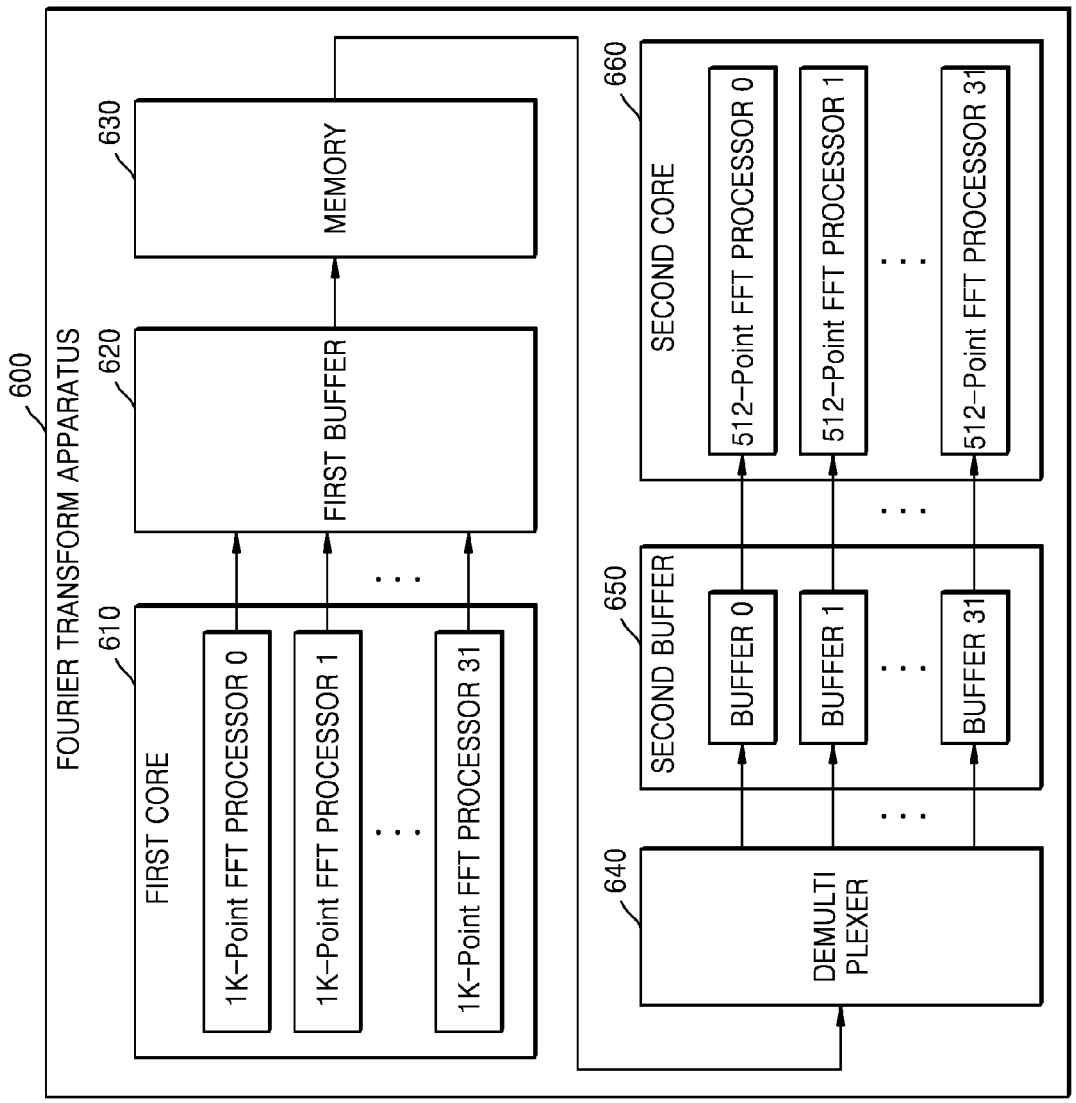
FIG. 6 is a block diagram for explaining a transform apparatus, according to an exemplary embodiment.

FIG. 6 is a block diagram for explaining a Fourier transform apparatus 600, according to an exemplary embodiment. Referring to FIG. 6, the Fourier transform apparatus 600 may include a first core 610, a first buffer 620, a memory 630, a demultiplexer 640, a second buffer 650, and a second core 660.

In FIG. 6, a case in which the size of image data is, for example, 1K×512, is described. Accordingly, 1D FFT processors included in the first core 610 are a 1K-Point FFT processor, and 1D FFT processors included in the second core 660 are a 512-Point FFT processor. The 1K-Point FFT processor may perform the Fourier transform with respect to one thousand twenty-four (1024) pixel values, and the 512-Point FFT processor may perform the Fourier transform with respect to five hundred and twelve (512) pixel values. The number of processors included in the first core 610 and the second core 660 may vary according to the input image data.

The first core 610 includes a plurality of 1K-Point FFT processors. The 1K-Point FFT processors perform respective 1D Fourier transforms on image data. The term "1K-Point" denotes that a processor performs a 1D Fourier transform on one thousand twenty-four (1024) pixel values of the image data. For example, the first core 610 may include thirty-two (32) 1K-Point FFT processors. A 1K-Point FFT processor 0 denotes the $0^{th}$ processor, a 1K-Point FFT processor 1 denotes the 1$^{st}$ processor, and a 1K-Point FFT processor 31 denotes the 31$^{st}$ processor. The 1K-Point FFT processor 0 may transform the 0$^{th}$ row of the image data, the 1K-Point FFT processor 1 may transform the first row of the image data, and the 1K-Point FFT processor 31 may transform the 31$^{st}$ row of the image data. The 1K-Point FFT processor 0 to the 1K-Point FFT processor 31 may simultaneously perform Fourier transforms with respect to the respective rows and sequentially output intermediate values. The intermediate value indicates a pixel value generated by performing the Fourier transform on the image data, and represents a portion of the intermediate data.

The first buffer 620 sequentially stores the intermediate values output from the first core 610. The first buffer 620 stores the intermediate value output from the 1K-Point FFT processor 0 to the 1K-Point FFT processor 31. For example, the first buffer 620 may store thirty-two (32) intermediate values sequentially output from the 1K-Point FFT processor 0 to the 1K-Point FFT processor 31, and output thirty-two (32) intermediate values to the memory 630. The thirty-two (32) intermediate values that are primarily stored represent the pixel values of the first column of the intermediate data. Next, the first buffer 620 may store the thirty-two (32) intermediate values that are sequentially output from the 1K-Point FFT processor 0 to the 1K-Point FFT processor 31, and the thirty-two (32) intermediate values that are secondly stored represent the pixel values of the second column of the intermediate data. The order of the intermediate values output from the first core 610 is described in detail with reference to FIG. 8.

The memory 630 stores the intermediate data. The memory 630 may store respective intermediate values output from the first buffer 620 at designated start positions. The memory 630 may store respective intermediate values at respective start positions designated in different corresponding banks. Whenever one row of image data is transformed, the start position may be changed. Accordingly, when the Fourier transform with respect to one row of image data is completed, intermediate values are stored at different start positions. For example, whenever the 1K-Point FFT processor 0 to the 1K-Point FFT processor 31 respectively complete a transform of a single row, the start position is changed. Accordingly, when there are a total of five hundred and twelve (512) rows and a total of thirty-two (32) 1K-Point FFT processors, as the 1K-Point FFT processor 0 performs the Fourier transform with respect to sixteen (16) rows, the start position may be designated sixteen (16) times. The intermediate values are sequentially stored from the designated start position until the start position is changed. In this state, since the Fourier transform is performed with respect to the 1$^{st}$ row to 32$^{nd}$ row of the image data at the same time, the intermediate values with respect to the 1$^{st}$ row to 32$^{nd}$ row of the image data are sequentially stored at the primarily designated start positions.

The memory 630 outputs the intermediate values of the same column to the demultiplexer 640. In other words, the memory 630 outputs the intermediate data in the column direction, i.e., on a column-by-column basis. Since the intermediate values of the same column are divided and stored at different start positions, the memory 630 may read out the respective intermediate values stored at different start positions and output the intermediate values included in one column, that is, one column of the intermediate data, to the demultiplexer 640. For example, the memory 630 may read out thirty-two (32) intermediate values (a total of 16×32=512) respectively from the first to sixteenth start position and output read-out intermediate values to the demultiplexer 640.

The demultiplexer 640 outputs the intermediate values included in one column to the second buffer 650. The demultiplexer 640 outputs the intermediate values included in one column of the intermediate data to each of a buffer 0 to a buffer 31 included in the second buffer. For example, the demultiplexer 640 may output the intermediate data of the first or thirty-second column to the buffer 0.

The second buffer 650 may include a plurality of buffers. For example, the second buffer 650 may include thirty-two (32) buffers. The number of buffers corresponds to the number of the 512-Point FFT processors included in the second core 660. In other words, each buffer corresponds to a respective 512-Point FFT processor in a one-buffer-to-one-processor correspondence.

The second core 660 may include a plurality of 512-Point FFT processors. For example, the second core 660 may include thirty-two (32) 512-Point FFT processors and simultaneously perform the Fourier transform with respect to thirty-two (32) columns. The 512-Point FFT processors perform a 1D Fourier transform on the intermediate data. The term "512-Point" denotes that a processor performs the 1D Fourier transform on five hundred and twelve (512) pixel values of the intermediate data.

FIG. 7 illustrates dividing data, according to an exemplary embodiment. Referring to FIG. 7, data 700 is divided into a plurality of windows.

"u0v0" to "u15v31" indicate windows of 16×32. i.e., 16 rows of windows and 32 columns of windows. One window may include pixel values of M×N. As an example, as illustrated in FIG. 7, each window may include pixel values of 32×32. "M" denotes a size of a row (horizontal), whereas "N" denotes a size of a column (vertical). (0,0) to (511, 1023) indicate coordinates of the data 700.

(0, 0) to (0, 1023) indicates the 0$^{th}$ row of the data 700. The data 700 may include a total of five hundred and twelve (512) rows from the 0$^{th}$ row to the 511$^{th}$ row.

(0, 0) to (511, 0) indicates the 0$^{th}$ column of the data 700. The data 700 may include a total of one thousand twenty-four (1024) columns from the 0$^{th}$ column to the 1023$^{rd}$ column.

The image data 310, the intermediate data 320, and the final data 330 of FIG. 3 may have the same shape as that of the data 700 of FIG. 7. In other words, if the image data 310 includes pixel values of (0,0) to (511,1023), the intermediate data 320 and the final data 330 include pixel values in the same form as the image data 310.

In FIG. 7, the data 700 is divided into windows of 32×32, i.e., each window has 32 rows of pixels and 32 columns of pixels. The size of a window may be determined according to the number of 1D FFT processors connected to an input end and an output end of the memory 630. The 1D FFT processors connected to the input end are included in the first core 610, whereas the 1D FFT processors connected to the output end are included in the second core 660.

For example, the number of rows of a window is equal to the number of the 1D FFT processors connected to the input end, whereas the number of columns of a window is equal to the number of 1D FFT processors connected to the output end. When the number of the 1D FFT processors connected to the input end and the output end is equal to thirty-two (32), the data 700 are divided into windows of 32×32. In another example, when the number of the 1D FFT processors connected to the output end is equal to thirty-two (32), and the number of the 1D FFT processors connected to the input end is equal to sixteen (16), the data 700 is divided into windows of 32×16 (the size of a window is indicated by [height×breadth] or [number of rows×number of columns]).

Figure 8:
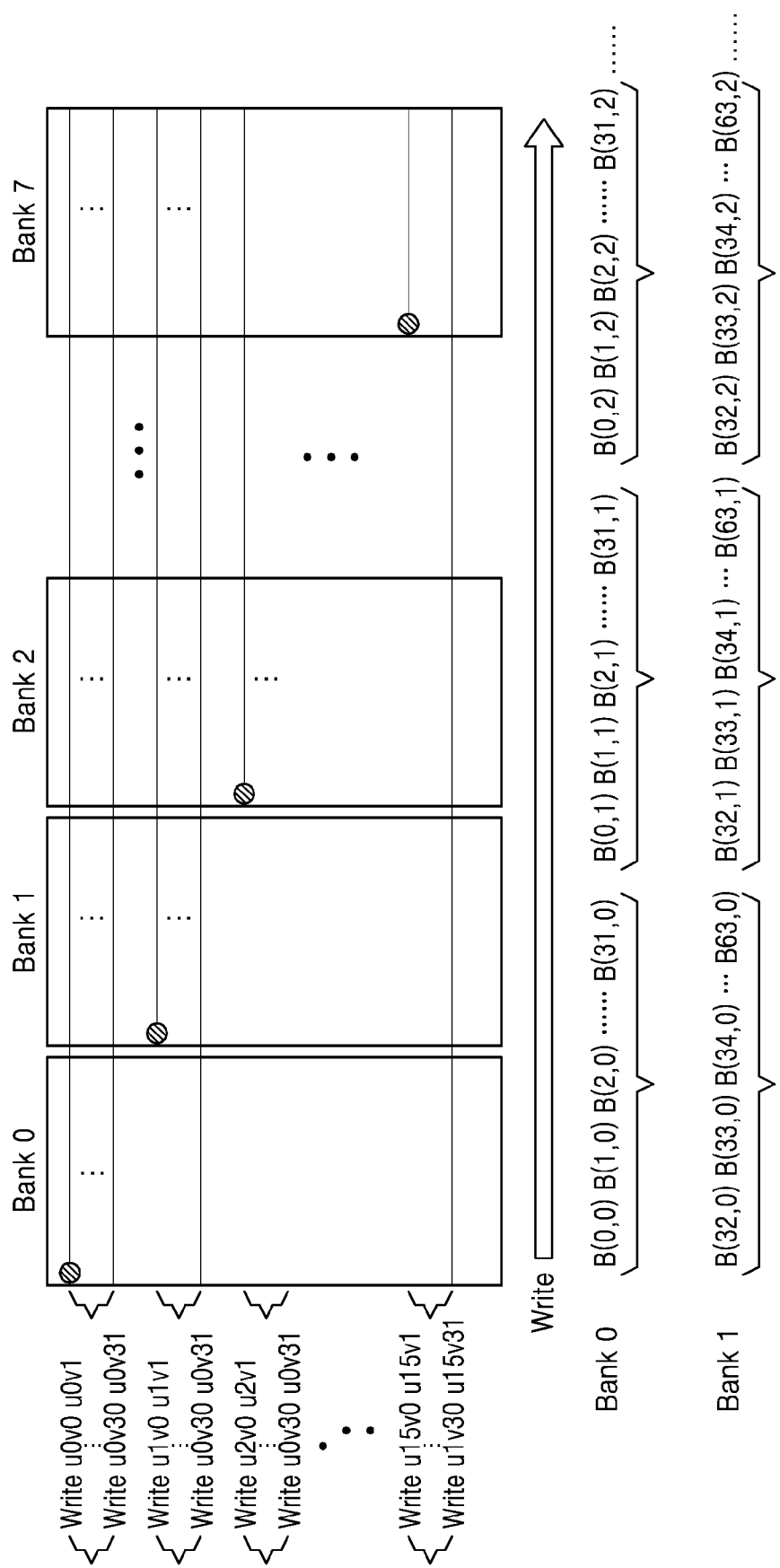
FIG. 8 illustrates a method of storing intermediate data in a memory, according to an exemplary embodiment.

FIG. 8 illustrates a method of storing the intermediate data in the memory, according to an exemplary embodiment. Referring to FIG. 8, the Fourier transform apparatus 600 divides the intermediate data 320 and stores divided intermediate data at different respective start positions of the memory 630. The intermediate data 320, as illustrated in FIG. 7, is divided into a plurality of windows, and pixel values included in the windows are stored in the memory 630.

FIG. 8 illustrates an example of sequentially storing Bank0 to Bank7 at start positions. In other words, Bank0 is designated as a first start position (and a ninth start position), Bank1 is designated as a second start position (and a tenth start position), and Bank7 is designated as a sixteenth start position (and an eighth start position).

The banks are not necessarily sequentially designated as start positions. A previous start position and a next start position may be designated as different banks which are not necessarily in sequence with each other. For example, Bank0 may be designated as a first start position, whereas Bank5 may be designated as a second start position.

The Fourier transform apparatus 600 designates Bank0 as a start position and sequentially writes pixel values included in u0v0 to u0v31 in Bank0 to Bank7 (write). In other words, the Fourier transform apparatus 600 writes the windows u0v0 to u0v31 in the same row at a first start position. The u0v0 to u0v31 are example of the windows of the same row.

The Fourier transform apparatus 600 writes the pixel values included in each window in the memory 630 in the column direction. For example, a lower end in FIG. 8 indicates an order of the pixel values written in Bank0 and Bank1. Bank0 is a first start position and Bank1 is a second start position. B(0,0) denotes a pixel value of the intermediate data 320. B(0,0) to B(31,0) are written in Bank0 and then B(0,1) to B(31,1) are written therein. B(0,0) to B(31,0) are pixel values included in the first column of u0v0, and B(0,1) to B(31,1) are pixel values included in the second column of u0v0. The Fourier transform apparatus 600, which writes pixel values in the column direction, may easily read out the intermediate data 320 in the column direction when reading out the intermediate data 320 from the memory 630. In other words, although the pixel values are written in the memory 630 in the row direction of the memory 630, the pixel values are arranged in the column direction of the intermediate data 320.

During the writing of the pixel values included in u0v0 to u0v31, when a storage space in one row of Bank0 is insufficient, the pixel values are written in Bank1. FIG. 8 illustrates, as an example, a case in which the pixel values included in u0v0 to u0v31 are written in a plurality of rows of Bank0 to Bank7.

After writing all windows u0v0 to u0v31 included in the first row, the Fourier transform apparatus 600 writes the windows u1v0 to u1v31 included in the second row at a second start position. The second start position may be a bank that is different from the first start position. In FIG. 8, a case in which Bank1 is designated as a second start position is illustrated as an example. The Fourier transform apparatus 600 sequentially writes, from Bank1, the pixel values of the windows u1v0 to u1v31 included in the second row.

The Fourier transform apparatus 600 writes the pixel values of windows u1v0 to u1v31 included in the second row in the column direction. The lower portion of FIG. 8 shows an order of writing the pixel values of the windows u1v0 to u1v31 included in the second row by designating Bank1 as a second start position. The Fourier transform apparatus 600 writes B(32,0) to B(63,0) and B(32,1) to B(63,1) in Bank1. B(32,0) to B(63,0) are pixel values included in the first column of u1v0, and B(32,1) to B(63,1) are pixel values included in the second column of u1v0. The Fourier transform apparatus 600 writes pixel values included in the thirty-second column of u1v31, thereby terminating the writing of the pixel values of the windows u1v0 to u1v31 included in the second row.

Finally, the Fourier transform apparatus 600 writes pixel values of windows u15v0 to u15v31 included in the sixteenth row from Bank7 that is a sixteenth start position. The Fourier transform apparatus 600 writes pixel values included in u15v31 that is a last window, in the memory 630, thereby terminating the writing of the intermediate data 320 in the memory 630.

Figure 9:
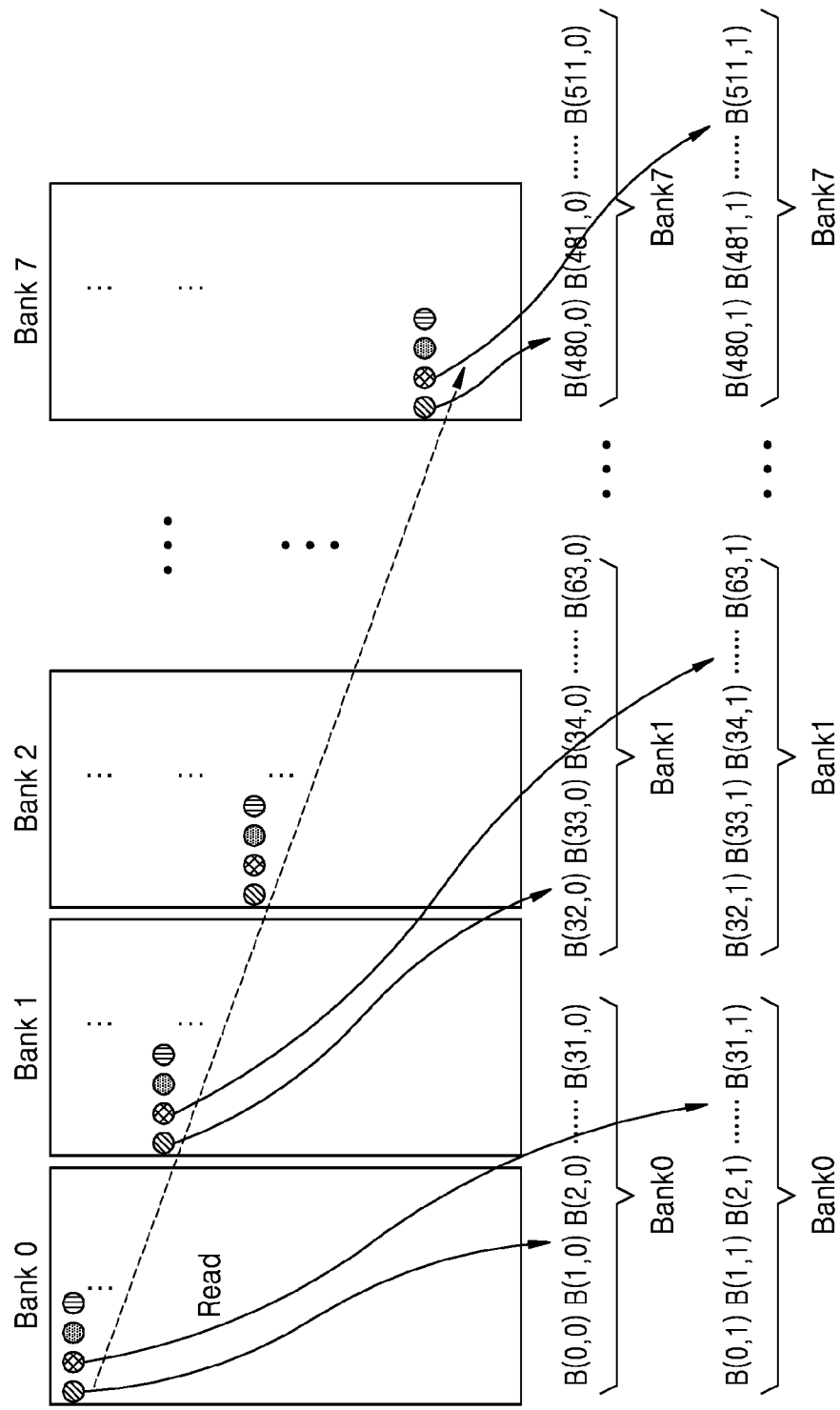
FIG. 9 illustrates a method of reading out intermediate data from the memory, according to an exemplary embodiment.

FIG. 9 illustrates a method of reading out intermediate data from the memory 630, according to an exemplary embodiment. Referring to FIG. 9, the Fourier transform apparatus 600 may read out the intermediate data 320 in the column direction. For example, the Fourier transform apparatus 600 may read out pixel values B(0,0) to B(511,0) in the first column of the intermediate data 320, pixel values B(0,1) to B(511,1) in the second column, and finally, pixel values B(0,1023) to B(511,1023) in the one thousand twenty-fourth (1024th) column.

The Fourier transform apparatus 600 may read out one column of the intermediate data 320 by reading out pixel values that correspond to a size of a column of a window from respective start positions. The start positions indicate positions designated when the intermediate data 320 is stored in the memory 630. The size of a column of a window may be or correspond to the number of 1D FFT processors generating the intermediate data 320.

A case in which start positions are sequentially shifted from Bank0 to Bank7 and the size of a column of a window is 32 is illustrated, for example in FIG. 9. The Fourier transform apparatus 600 reads out thirty-two (32) pixel values B(0,0) to B(31,0) from the start position of Bank0 and thirty-two (32) pixel values B(32,0) to B(63,0) from the start position of Bank1. The Fourier transform apparatus 600 reads out pixel values according to the order of start positions, and finally reads out thirty-two (32) pixel values B(480,0) to B(511,0) from the start position of Bank7. The Fourier transform apparatus 600 reads out thirty-two (32) pixel values from each of all start positions, thereby reading out pixel values B(0,0) to B(511,0) in the first column of the intermediate data 320.

In order to read out the pixel values of the second column of the intermediate data 320, the Fourier transform apparatus 600 reads out $33^{rd}$ to $64^{th}$ pixel values B(0,1) to B(31,1) from the start position of Bank0 and $33^{rd}$ to $64^{th}$ pixel values B(32,1) to B(63,1) from the start position of Bank1. The Fourier transform apparatus 600 reads out pixel values according to the order of start positions and finally reads out $33^{rd}$ to $64^{th}$ pixel values B(480,1) to B(511,1) from the start position of Bank7. The Fourier transform apparatus 600 reads out thirty-two (32) pixel values from each of the thirty-third positions of all start positions, thereby reading out pixel values B(0,1) to B(511,1) in the second column of the intermediate data 320.

By repeating the above-described process, the Fourier transform apparatus 600 may read out a total of one thousand twenty-four (1024) columns from the $0^{th}$ column to $1023^{rd}$ column of the intermediate data 320. The Fourier transform apparatus 600 reads out each column and outputs the read columns to the second buffer 650.

Figure 10:
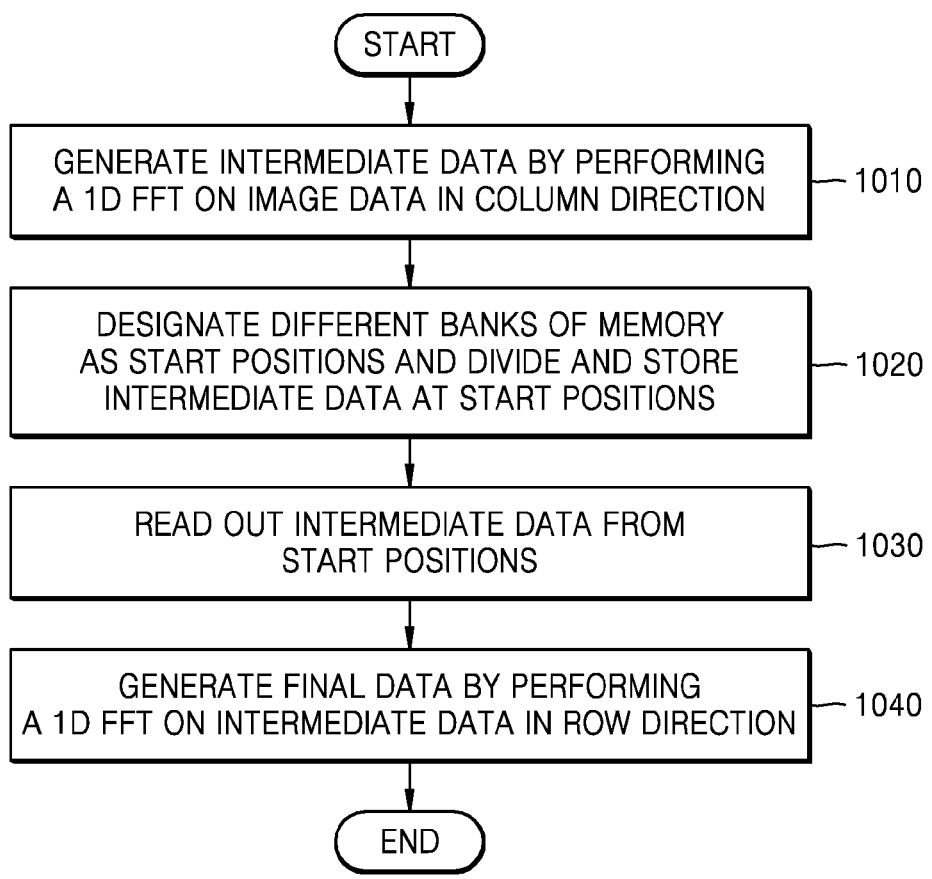
FIG. 10 is a flowchart for explaining a Fourier transform method, according to another exemplary embodiment.

FIG. 10 is a flowchart for explaining a Fourier transform method, according to another exemplary embodiment. FIG. 10 illustrates a method in which the Fourier transform apparatus 400 performs a 1D FFT on the image data 210 in the column direction and then performs a 1D FFT on the image data 210 in the row direction, as illustrated in FIG. 2.

In operation 1010, the Fourier transform apparatus 400 performs a 1D FFT on the image data 210 in the column direction (i.e., on a column-by-column basis) in order to generate the intermediate data 220. The first core 420 performs a 1D FFT with respect to each column of the image data 210. Each of the 1D FFT processors included in the first core 420 performs a respective 1D FFT with respect to the corresponding rows of the image data 210. In this state, one 1D FFT processor may perform a 1D FFT with respect to a plurality of rows. For example, when there are thirty-two (32) 1D FFT processors, a first 1D FFT processor may perform a 1D FFT with respect to the $0^{th}$ row, the $32^{nd}$ row, the $64^{th}$ row, etc. of the image data 210.

In operation 1020, the Fourier transform apparatus 400 designates different banks of the memory 430 as start positions, and divides and stores the intermediate data 220 at the respective start positions. For example, if the Fourier transform apparatus 400 designates the $0^{th}$ bank as a start position, the $1^{st}$ bank may be designated as a next start position and the $2^{nd}$ bank may be designated as a further next start position. If the intermediate data 220 is divided into three parts, the Fourier transform apparatus 400 may store a first part from the $0^{th}$ bank, a second part from the $1^{st}$ bank, and a third part from the $2^{nd}$ bank. The intermediate data 220 may be divided based on a column in which the data is located. For example, if the intermediate data 220 includes sixty-four (64) columns, the $0^{th}$ to $31^{st}$ columns form a first part and the $32^{nd}$ to $63^{rd}$ columns form a second part. The Fourier transform apparatus 400 may store the intermediate data 220 in the row direction, i.e., on a row-by-row basis. For example, the first row of the first part, the first row of the second part, and the first row of the third part of the intermediate data 220 may be sequentially stored in the $0^{th}$ bank.

In operation 1030, the Fourier transform apparatus 400 reads out the intermediate data 220 from the start positions of the memory 430. The Fourier transform apparatus 400 may read out the intermediate data 220 in the row direction by repeating a process of reading out the intermediate data 220 from each start position to a particular position. For example, the Fourier transform apparatus 400 may read out the $1^{st}$ to $32^{nd}$ pixel values from the $0^{th}$ bank, the $1^{st}$ to $32^{nd}$ pixel values from the $1^{st}$ bank, and the $1^{st}$ to $32^{nd}$ pixel values from the $2^{nd}$ bank, thereby reading out the first row of the intermediate data 220. Furthermore, the Fourier transform apparatus 400 reads out the $33^{rd}$ to $64^{th}$ pixel values from the $0^{th}$ bank, the $33^{rd}$ to $64^{th}$ pixel values from the $1^{st}$ bank, and the $33^{rd}$ to $64^{th}$ pixel values from the $2^{nd}$ bank, thereby reading out the second row of the intermediate data 220. As described above, the Fourier transform apparatus 400 may read out the intermediate data 220 in the row direction by reading out the pixel values at the same position from the respective start positions.

In operation 1040, the Fourier transform apparatus 400 generates the final data 230 by performing a 1D FFT on the intermediate data 220 in the row direction, i.e., on a row-by-row basis. Since in the operation 1030 the Fourier transform apparatus 400 reads out the intermediate data 220 from the memory 430 in the row direction, the Fourier transform apparatus 400 may perform a 1D FFT on the intermediate data 220 in the row direction by performing a 1D FFT on the read-out data. The respective rows may be transformed by sequentially being input into the 1D FFT processor.

As described above, the intermediate data may be divided and stored in different respective banks of the memory. The intermediate data stored in different banks may be read out without a delay. An amount of address calculations may be reduced by designating start positions to store the intermediate data.

In an aspect, an exemplary embodiment provides a method for performing a Fourier transform. The method includes: receiving input image data; performing a first one-dimensional (1D) fast Fourier transform (FFT) on the image data on a row-by-row basis in order to generate intermediate data; partitioning the generated intermediate data into at least two data groups; demultiplexing the partitioned data; and performing a second 1D FFT on the demultiplexed data on a column-by-column basis in order to generate final data.

In the method, the performing the first 1D FFT may include using a plurality of first processors to perform respective 1D FFTs on corresponding rows of the image data, and a number of rows of the image data may be equal to an integral multiple of a number of the first processors such that each of the plurality of first processors performs an equal number of 1D FFTs in parallel with each other.

In the method, the performing the second 1D FFT may include using a plurality of second processors to perform respective 1D FFTs on corresponding columns of the demultiplexed data, and a number of columns of image data may be equal to an integral multiple of a number of the second processors such that each of the plurality of second processors performs an equal number of 1D FFTs in parallel with each other.

In the method, the partitioning may be performed by designating respective sections of a memory and storing each respective data group in a corresponding section of the memory.

The apparatus described herein may comprise a processor, a memory for storing program data to be executed by the processor, a permanent storage such as a disk drive, a communications port for handling communications with external devices, and user interface devices, including a display, keys, and/or any other suitable device. When software modules are involved, these software modules may be stored as program instructions or computer readable code executable by the processor on a non-transitory computer-readable medium such as read-only memory (ROM), random-access memory (RAM), compact disk-ROM (CD-ROMs), magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

The exemplary embodiments may be described in terms of functional block components and various processing steps. Such functional blocks may be realized by any number of hardware and/or software components configured to perform the specified functions. For example, the exemplary embodiments may employ various integrated circuit (IC) components, e.g., memory elements, processing elements, logic elements, look-up tables, and the like, which may carry out a variety of functions under the control of one or more microprocessors or other control devices. Similarly, where the elements of the exemplary embodiments are implemented using software programming or software elements, the exemplary embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the exemplary embodiments could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples of the present inventive concept and are not intended to otherwise limit the scope of the present inventive concept in any way. For the sake of brevity, conventional electronics, control systems, software development and other functional aspects of the systems may not be described in detail. Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of the terms "a" and "an" and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The exemplary embodiments are not limited to the described order of the steps. The use of any and all examples, or language (e.g., "such as") provided herein, is intended merely to better illuminate the exemplary embodiments and does not pose a limitation on the scope of the present inventive concept unless otherwise claimed. Numerous modifications and adaptations will be readily apparent to one of ordinary skill in the art without departing from the spirit and scope of the present inventive concept.

What is claimed is:

1. A method of performing a Fourier transform, the method comprising:
   performing a first one-dimensional (1D) fast Fourier transform (FFT) on image data on a row-by-row basis in order to generate intermediate data;
   designating at least two different banks of a single memory as respective start positions, dividing the intermediate data, and storing the divided intermediate data at the start positions;
   reading out the intermediate data at the start positions; and
   generating final data by performing a second 1D FFT on the intermediate data on a column-by-column basis.

2. The method of claim 1, wherein the designating the at least two different banks of the memory as the start positions comprises designating sequentially shifted banks as the start positions.

3. The method of claim 1, wherein the designating the at least two different banks of the memory as the start positions comprises designating a second bank that is different from a first bank of a previous start position as a start position.

4. The method of claim 1, wherein, in the performing the first 1D FFT, for each respective row of the image data, a corresponding one from among a plurality of first processors performs a respective 1D FFT, and
   in the designating the at least two different banks of the memory as the start positions and the dividing and storing the intermediate data at the start positions, the intermediate data output from the plurality of first processors are sequentially stored, and when a respective 1D FFT for a corresponding row of the image data has been performed, another bank is designated as a start position.

5. The method of claim 1, wherein the intermediate data is divided into a plurality of windows, each window having a size that corresponds to a number of first processors and a number of second processors, and
   in the designating the at least two different banks of the memory as the start positions and the dividing and storing the intermediate data at the start positions, the intermediate data included in the plurality of windows in a same row are sequentially stored from same start positions.

6. The method of claim 5, wherein, in the designating the at least two different banks of the memory as the start positions and the dividing and storing the intermediate data at the start positions, when a row is changed, the subsequently generated intermediate data is stored at a changed start position.

7. The method of claim 1, wherein each of the start positions indicates a respective address of the memory at which intermediate data transformed in parallel by a plurality of first processors is stored.

8. The method of claim 1, wherein the reading out the intermediate data comprises reading out a pixel value, that corresponds to a number of a plurality of first processors that generate the intermediate data in parallel, at a first start position.

9. A non-transitory computer readable storage medium having stored thereon a program, which when executed by a computer, performs the method defined in claim 1.

10. A method of performing a Fourier transform, the method comprising:
    performing a one-dimensional (1D) fast Fourier transform (FFT) on image data on a column-by-column basis in order to generate intermediate data;
    designating at least two different banks of a single memory as respective start positions, dividing the intermediate data, and storing the divided intermediate data at the start positions;
    reading out the intermediate data at the start positions; and
    generating final data by performing a 1D FFT on the intermediate data on a row-by-row basis.

11. A Fourier transform apparatus comprising:
    a first core which includes at least one first processor and is configured to perform a one-dimensional (1D) fast Fourier transform (FFT) on image data on a row-by-row basis in order to generate intermediate data;
    a single memory comprising a plurality of banks, the memory being configured to designate at least two different banks from among the plurality of banks as respective start positions, to divide the intermediate data, and to store the divided intermediate data at the start positions; and a second core which includes at least one second processor and is configured to read out the intermediate data at the start positions, and to generate final data by performing a 1D FFT on the intermediate data on a column-by-column basis.

12. The Fourier transform apparatus of claim 11, wherein the memory is further configured to designate sequentially shifted banks as start positions.

13. The Fourier transform apparatus of claim 11, wherein the memory is further configured to designate a second bank which is different from a first bank that corresponds to a previous start position as a start position.

14. The Fourier transform apparatus of claim 11, wherein the first core comprises a plurality of first processors, each respective first processor from among the plurality of first processors is configured to perform a respective 1D FFT with respect to a corresponding row of the image data, and the memory is further configured to sequentially store the intermediate data output from the plurality of first processors in respective banks of the memory, and when a row of the image data on which the plurality of first processors perform a 1D FFT is changed, to designate another bank as a start position.

15. The Fourier transform apparatus of claim 11, wherein the first core comprise a plurality of first processors, the second core comprises a plurality of second processors, the intermediate data is divided into a plurality of windows, each window having a respective size that corresponds to a number of the plurality of first processors and a number of the plurality of second processors, and the memory is further configured to store each of the plurality of windows in a same row of the intermediate data at same start positions.

16. The Fourier transform apparatus of claim 15, wherein, when a row of the window is changed, the memory is further configured to store the subsequently generated intermediate data at a changed start position.

17. The Fourier transform apparatus of claim 11, wherein each of the start positions indicates a respective address of the memory at which intermediate data transformed in parallel by a plurality of first processors is stored.

18. The Fourier transform apparatus of claim 11, wherein the second core is further configured to read out a pixel value that corresponds to a number of first processors that generate the intermediate data in parallel, from a first start position.

* * * * *